United States Patent [19]

Shinoda et al.

[11] Patent Number: 4,873,149
[45] Date of Patent: Oct. 10, 1989

[54] VIBRATION-DAMPER METAL SHEETS

[75] Inventors: Kenichi Shinoda; Tomoyoshi Iwao; Tomoaki Isayama; Yuichi Higo, all of Hiroshima, Japan

[73] Assignee: Nisshin Steel Co., Ltd., Tokyo, Japan

[21] Appl. No.: 177,524

[22] PCT Filed: Jun. 18, 1987

[86] PCT No.: PCT/JP87/00402

§ 371 Date: Mar. 28, 1988

§ 102(e) Date: Mar. 28, 1988

[87] PCT Pub. No.: WO87/07872

PCT Pub. Date: Dec. 30, 1987

[30] Foreign Application Priority Data

Jun. 20, 1986 [JP] Japan .................. 61-142709
Aug. 1, 1986 [JP] Japan .................. 61-180151

[51] Int. Cl.⁴ .............................................. B32B 7/00
[52] U.S. Cl. ..................... 428/609; 428/594; 428/614
[58] Field of Search ............... 428/614, 594, 609

[56] References Cited

U.S. PATENT DOCUMENTS

| | | | |
|---|---|---|---|
| Re. 22,373 | 9/1943 | Benner et al. | 428/614 |
| 2,244,771 | 6/1941 | Figour | 428/609 |
| 2,285,583 | 6/1942 | Jennings et al. | 428/609 |
| 2,292,991 | 8/1942 | Crompton, Jr. | 428/609 |
| 2,490,548 | 12/1949 | Schultz | 428/609 |
| 2,627,649 | 2/1953 | Matthysse | 428/586 |
| 3,860,443 | 1/1975 | Lachman et al. | 428/614 |
| 4,005,991 | 2/1977 | Uebayasi et al. | 428/609 |
| 4,154,900 | 5/1979 | Kaku et al. | 428/609 |
| 4,565,744 | 1/1986 | Walter et al. | 428/614 |
| 4,753,850 | 6/1988 | Ibe et al. | 428/614 |

FOREIGN PATENT DOCUMENTS 0139540 10/1980 Japan .................. 428/609

Primary Examiner—L. Dewayne Rutledge
Assistant Examiner—David Schumaker
Attorney, Agent, or Firm—Fleit, Jacobson, Cohn, Price, Holman & Stern

[57] ABSTRACT

The present invention relates to a vibration-damping metal sheet.

Conventional vibration-damping metal sheets such as single metal sheets of Mn-Cu base alloys, etc., and sandwich steel sheets having an intermediate plastic material had individually some disadvantages in connection with critical temperatures for use, heat resistance, weldability, conductivity and other properties.

In the present invention, metal plates (1) and (2) are joined together through minute inclusions (3) permitted to be substantially uniformly present therebetween and bit thereinto and, optionally, through the diffusion of a portion of the metal plates into which the minute inclusions are bit. At another portion, the metal plates (1) and (2) only come into contact with each other. Metal or ceramic powders, or wiry or network materials may be used as the minute inclusions (3).

The sheets of the present invention are best-suited for use with foundation metals of high-speed rotators or structural materials for working structures, which are often exposed to high temperatures.

10 Claims, 3 Drawing Sheets

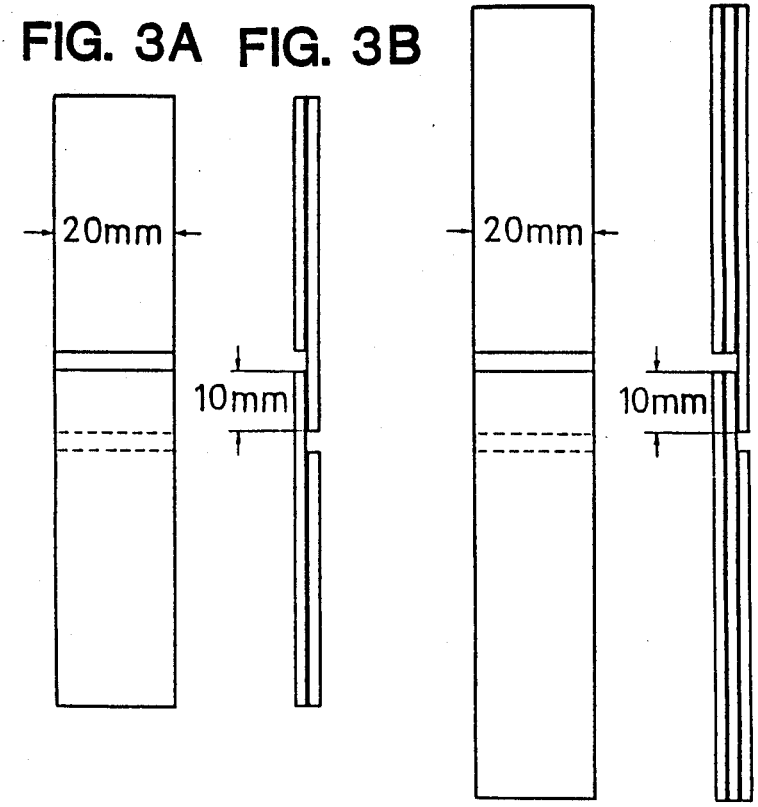

VIBRATION-DAMPER METAL SHEETS

TECHNICAL FIELD

The present invention relates to a vibration-damping metal sheet suitably designed to be used as members required to possess vibration-damping properties as well as heat resistance, weldability and toughness etc., said members being represented by, e.g. foundation metals for and gears in diamond cutters or chip saws used as high speed rotators or structural materials etc. needed to have vibration-damping properties such as working structures in automobiles.

BACKGROUND TECHNIQUES

Materials making use of magnetostriction such as those represented by 12Cr-3Al-Fe, Mn-Cu base alloys and cast iron have been known as vibration-damping materials for a long time. In recent years, sandwich steel sheets having a plastic material between steel plates have been put to practical use.

Of these conventional art vibration-damping materials, the materials making use of magnetostriction such as those represented by 12Cr-3Al-Fe or the Mn-Cu base alloys have had the disadvantages that their vibration-damping properties do not only decrease markedly by plastic working, but drop with increases in temperature. Hence, the critical temperatures for use are 380° C. for the former and 80° C. for the latter. Another problem of such materials has been that their product cost is high. Although cast iron is also a material of which vibration-damping properties have been noted from of old, its vibration-damping properties are not so excellent. The cast iron only produces its vibration-damping properties on its own mass. Albeit inexpensive, the cast iron has the disadvantage that it cannnot be used as the structural material having a limited sectional area, since it is not only poor in plastic workability and weldability but has low strength and is unstable. Referring further to the sandwich steel sheet having a plastic material interposed between steel plates, which is now the most noticeable vibration-damping material in view of its excellent vibration-damping properties and plastic workability, some problems have arisen in that it can only stand up to use at a temperature of as low as 100° C., and is thus not only poor in heat resistance, but is also lacking weldability due to the absence of conductivity, since the platic material is used as the material to attain vibration-damping properties.

Still further, an extremely special vibration-damping material has been proposed, which is obtained by the procedures comprising the steps of subjecting the surface layer of a metal sheet to an intergranular oxidation, a sensitizing or a mechanical treatment to give flaws to the surface thereof, and subjecting the metal sheet having its surface layer thus processed to processing such as cold rolling to introduce intergranular fracture or converting the surface flaws to scab marks, thereby attaining vibration-damping properties. However, the vibration-damping material obtained by such procedures offers some problems in that its plastic workability is poor due to the presence of surface fractures, and its fatigue strength drops markedly so that is reliability as a structural material becomes poor.

DISCLOSURE OF THE SUMMARY OF THE INVENTION

In consequence of studies made to solve the aforesaid problems the conventional art offers, and to develop a vibration-damping sheet suitably used as the member which is required to be plastic workable, heat resistant, weldable and tough, and also to excel in vibration-damping properties, the present inventors have found that a vibration-damping sheet having the desired properties can be obtained by joining together metal plates, while allowing minute inclusions such as iron powders to be present therebetween and bite thereinto, and predetermining the desired range of the joint area of the metal plates to be joined together through the minute inclusions biting thereinto.

More specifically, the present invention is concerned with a vibration-damping metal sheet characterized in that metal plates are joined together through minute inclusions permitted to be substantially uniformly present therebetween and bit thereinto, but come into contact with each other, while they are not metallurgically joined to each other, at a portion where said minute inclusions are not found, and the projection area of a portion of said metal plates, having said minute inclusions bit thereinto, with respect to the same surface as said contact surface accounts for 0.5 to 50% of the area of said metal plates.

In what follows, the vibration-damping sheets according to the present invention will be explained in more detail with reference to the drawings.

DETAILED DESCRIPTION OF THE INVENTION

Figure 1:
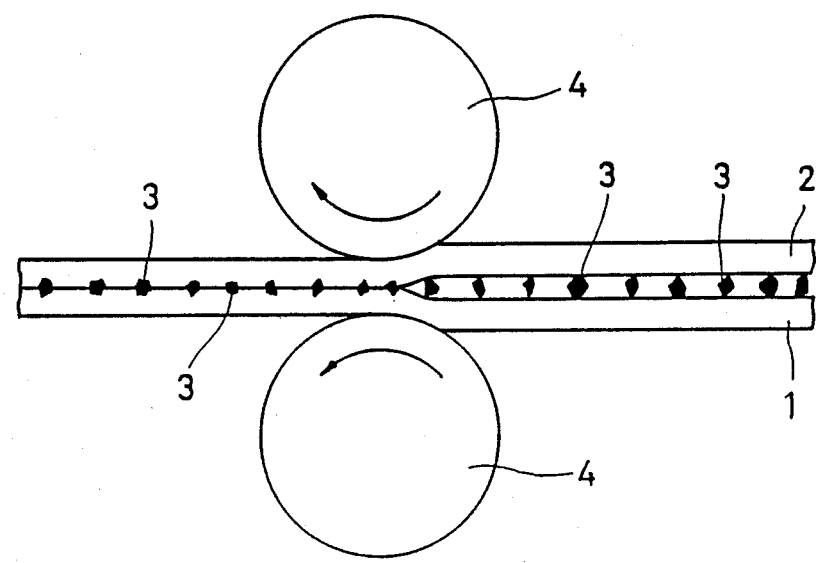
FIG. 1 is a view illustrative of one exmaple of the method for preparing the vibration-damping metal sheet according to the present invetnion.

As the description of the construction of the vibration-damping metal sheets according to the present invention will facilitate in describing its manufacturing method, the construction will now be explained with reference to the method for manufacturing the same.

In order to make the vibration-damping metal sheets according to the present invention, a predetermined amount of minute inclusions 3 are first substantially uniformly scattered between metal plates 1 and 2. Then, the metal plates 1 and 2 are cold- or warm-presesd against each other between pressure rolls 4 and 4 to bite the minute inclusions 3 into the metal plates 1 and 2, whereby the metal plates 1 and 2 are joined together, while they are allowed to come into contact with each other, but are not metallurgically joined to each other, at their portion where the inclusions 3 are not present. Moreover, the projection area of the joined portion with respect to the same surface as the aforesaid contact surface (which may hereinafter be simply called the projection area) accounts for 0.5 to 50% of the combined area of the metal plates 1 and 2 by the adjustment of the amount of the inclusions 3 to be scattered, etc. In this manner, a composite material serving as the vibration-damping metal sheet is obtained.

In the vibration-damping metal sheet according to the present invention, the metal plates 1 and 2 are joined to each other, while the minute inclusions 3 nearly uniformly scattered therebetween are bit thereinto. The projection area of the portion of the metal plates 1 and 2 having the minute inclusions 3 bit thereinto, i.e. the joined portion (which may hereinafter be simply referred to as the joined area) amounts to 0.5–50% or less of the combined area of the metal plates 1 and 2 (which corresponds to the surface area of one side of one metal plate, and shall be hereinafter simply called the area of the metal plate). Besides, the metal plates 1 and 2 are only allowed to contact each other, while not metallurgically joined to each other, at their portion where the inclusions 3 are not present, and which is to be subject to friction, thereby reducing vibrations and noises. (In what follows, the percentage of the joined area with respect to the area of the metal plate may simply be called the proportion of joined area). The joined area is calculated from distributions by sizes, obtained by forcedly separating the thus produced composite metal sheet into the original metal plates and measuring the sizes and quantities of the individual inclusions showing up on the separated surfaces of a given area.

In the structure as mentioned above, the vibration-damping properties increase with decreases in the joined area of the metal plates 1 and 2 having the minute inclusions 3 bit thereinto. However, too small a joined area gives rise to a reduction in the joint strength of the metal plates 1 and 2, which may in turn cause the metal sheet to deform at its end faces or to separate from each other between metal plates 1 and 2 during plastic working. Thus, the lower limit of the proportion of the joined area was set at 0.5%. On the other hand, an increased joined area leads to an increase in the joint strength of the vibration-damping metal sheet, but rather results in a drop in the vibration-damping properties, so that the significance in making it in a composite structure is lost. Thus the upper limit of the proportion of the joined area was set at 50%.

To join together the metal plates 1 and 2 by biting the minute inclusions 3 therein, techniques such as pressing or explosion pressing may be used, in addition to pressure contact with the pressure rolls 4 and 4, as illustrated in FIG. 1. Among others, the most favorable technique is the pressure contact with the pressure rolls 4 and 4 in order to adjust the projection area of the joined portion to a desired value and permit the metal plates 1 and 2 to be not fixedly pressed against each other, i.e. come into pressure contact with each other, while not metallurgically joined together, at their portion where the minute inclusions 3 are not present.

The higher the temperature at which such pressure contact occurs, the easier the joint will be. However, pressure contact operations at higher temperatures have the disadvantages that they do not only encounter difficulty and cause an increased variation in the joined area, but also incur fears that the skin of the obtained sheet product may deteriorate because of scaling, etc., and the metal plates 1 and 2 may be decarbonized, if they are formed of high-carbon steel. It is thus preferred that warm- or cold-pressure contact be carried out at a temperature of 700° C. or less. The warm-pressure contact operations given to a vibration-damping metal sheet shows relatively satisfactory joint strength. In the case where a metal is used as the minute inclusions 3, however, much increased joint strength is obtained, if annealing-accompanied-by-diffusion (hereinafter referred to as the diffusion annealing) is applied. Hence, satisfactory joint strength may obtained even with a small joined area. The diffusion annealing should preferably be carried out in a ferrite-phase region, when the metal plates 1 and 2 are formed of steel plates. However, it is preferable to carry out at a temperature equal to or higher than 650° C., since the rate of diffusion decreases at a lower temperature. Taken altogether, it is effective to carry out the diffusion annealing at a temperature elevated enough to exceed the $A_3$ transformation point and reach within an austenite-phase region, because an increased effect is attained owing to the rise in temperature, although the rate of diffusion drops. However, too high a temperature results in a defect that the metal plates 1 and 2 sieze upon each other. Thus, the diffusion annealing should preferably be conducted at a temperature equal to or lower than 1,200° C. Within such a temperature range, the diffusion annealing should preferably be conducted for a sufficient time of 0.5 hours or longer.

The metal plates 1 and 2 to be used may include various metal plates such as general-duty steel plates; special steel plates, e.g. carbon tool steel plates, stainless steel plates and nickel-chromium-molybdenum steel plates; non-ferrous metal plates, e.g. aluminium plates, copper plates, titanium plates and nickel plates; plated metal plates obtained by plating said general-duty steel plates, special steel plates and non-ferrous metal plates; and clad metal plates obtained by cladding of these metal plates. Depending upon the purpose, these metal plates may be subjected to desired hardening and heat treatments such as carburizing, nitriding, hardening and annealing to impart vibration-damping properties as well as abrasion resistance and toughness thereto. Both metal plates 1 and 2 joined to each other by the minute inclusions 3 need not be formed of the same material, and may optionally be formed of a combination of different materials, depending upon the purpose.

As the minute inclusions 3 to be employed, use may be made of any material which can bite into the metal plates 1 and 2 to join them together, such as metals, e.g. iron and ceramics in powder or finely wiry form and a network comprising such fine wires. The minute inclusions 3 may also consist only of a single-phase material (such as metals including alloys or ceramics), or may be coated on their surfaces with other metals. No particular limitation is placed on the type of the coating metals so far as the coating metals can bite into the metal plates 1 and 2 to join them together. It is not especially required to select low-melting metals having vibration-damping properties, but preference is given to metals which are easily diffusible into the metal plates 1 and 2 by heat treatments such as the duffusion annealing without forming any fragile alloys, e.g. the preferred is a metal represented by Cu and Ni etc. No special limitation is placed upon the thickness of the coating layer. However, a maximum thickness of about 5 micrometers is preferred, since too large a thickness does not necessarily result in an increase in the joint strength. In the case where the minute inclusions 3 coated on their surfaces with a metal easily diffusible into the metal plates 1 and 2 are used, mechanical biting of the inclusions 3 into the metal plate is combined with the diffusion of such a coating metal into the metal plates 1 and 2 at the portion where the inclusions bite thereinto, thereby increasing further the joint strength of the metal sheet.

Reference will now be made to the size of the minute inclusions 3. If the minute inclusions 3 are of metal or ceramic powders, then it is not especially required to adjust their particle size. Preferably, their mean particle size is larger than that of metal powders for ordinary powder metallurgy. In the presence of the minute inclusions 3 having an excessively large particle size, however, dents may show up on the surfaces of the metal plates 1 and 2 as if they come up from within, when they are joined together through such minute inclusions 3. Such dents may sometime impair the commercial value of the product. Hence, the particle size of the inclusions 3 is set at 1000 micrometers at most, and may be selected therefrom depending upon the purpose. Since smaller minute inclusions 3 undergo slight sintering around larger inclusions 3 biting into the metal plates 1 and 2, the damping effect from a frictional force is obtained, if the particle size of the minute inclusions 3 is small. When a large amount of smaller minute inclusions 3 exists, the smaller inclusions bite into the metal plates 1 and 2 around the larger inclusions, and decrease the joining effect on the metal plates 2 and 2. Thus, the minimum particle size of the minute inclusions 3 should preferably be about 100 micrometers. The same holds for the sectional diameter of wiry materials or network materials which may also be used as the minute inclusions 3. The powders may be regarded as short wiry materials, and the diameter of the minute inclusions 3 is preferably in a range of 100 to 10000 micrometers in terms of the mean diameter in the vertical section with respect to their lengthwise direction.

EXAMPLES INCLUDING THE BEST MODE FOR CARRYING OUT THE INVENTION AND COMPARISON EXAMPLES

The vibration-damping metal sheets according to the present invention will now be explained specifically with reference to the examples and comparison examples.

Figure 2:
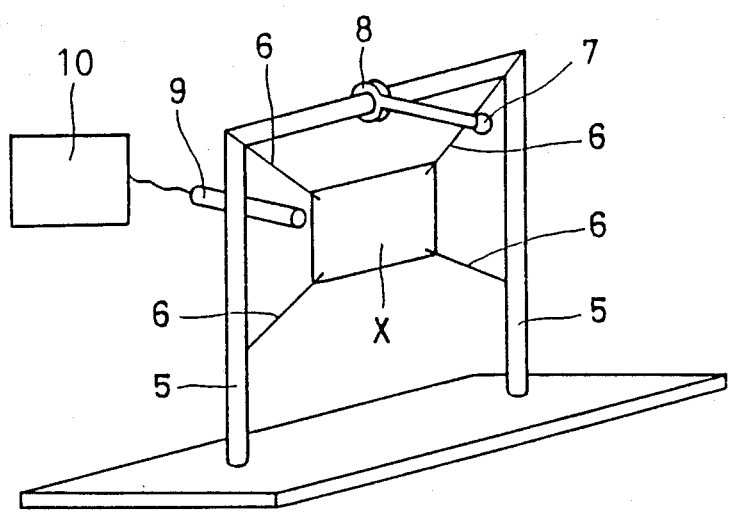
FIG. 2 is a perspective view showing a device for measuring a sound-pressure level, and FIGS. 3(A) and (B) and FIGS. 4(A) and (B) each are front and side views showing the shapes of test pieces for measuring shear load.

In the following respective examples, the vibration-damping properties were estimated in terms of the sound-pressure level measured by suspending a composite metal sheet X to be measured from a supporting frame 5 by means of threads 6 and allowing a hammer 7 rotatably mounted on an upper cross beam of said frame 5 by a bearing 8 to drop, while rotating, thereon from the horizontal state to receive at a microphone 9 a sound resulting from a blow struck upon the composite metal sheet X and determine the sound-pressure level by am amplifier 10, as illustrated in FIG. 2.

The mechanical properties were estimated in terms of the shear load obtained from the results of tensile tests conducted with test pieces, each being prepared by cutting off one side of a composite metal sheet of 20 mm in width and providing slits in the metal sheet to define a joined portion of 10 mm in length, as illustrated in FIGS. 3(A) and (B) or FIGS. 4(A) and (B).

Examples 1 to 11 & Comparison Examples 1 to 8

Use was made of respective two annealed, cold-rolled steel plates of low-carbon steel (SPCD) of 0.8 mm in thickness and carbon tool steel (SK5) of 1.6 mm in thickness, both having chemical compositions set forth in Table 1. (In this invention, it is noted that by the wordings "chemical compositions of metal" are meant the chemical components of said metal except for the main-componential metal thereof.) Varied amounts of iron powders A or B, set forth in Table 2, were uniformly scattered between the said two low-carbon steel (SPCD) and carbon tool steel (SK5) plates, which were then respectively cold-rolled into composite metal sheets of 1.6 mm (SPCD) and 3.2 mm (SK5) in thickness.

With regard to some of the thus obtained composite metal sheets, one-hour annealing was thereafter carried out at 850° C. for low-carbon steel (SPCD) and 700° C. for carbon tool steel (SK5) respectively. Most of the composite metal sheets in which SK5 were used were thermally refined in the following procedures, i.e. by one-hour annealing at 1,100° C., followed by hot-quenching at 800° C. and tempering at 200° C. In this manner, composite metal sheets having various proportions of joined area were made (Examples 1 to 11 & Comparison Examples 2,3 and 6 to 8).

As the comparative material for the aforesaid composite metal sheets, one sheet each of low-carbon steel (SPCD) of 1.6 mm in thickness and carbon tool steel (SK5) of 3.2 mm in thickness, each having the chemical composition set forth in Table 1, was cold-rolled and annealed (Comparison Examples 1, 4 and 5).

TABLE 1

| Steel Type | C | Si | Mn | P | S | (wt %) Al |
|---|---|---|---|---|---|---|
| SPCD | 0.005 | 0.014 | 0.13 | 0.014 | 0.007 | 0.012 |
| SK5 | 0.84 | 0.24 | 0.46 | 0.005 | 0.005 | 0.008 |

TABLE 2

| | Chemical Composition (wt %) | | | | | Hardness (Hv) | Mean Particle Size (μm) |
|---|---|---|---|---|---|---|---|
| | C | Si | Mn | P | S | | |
| Iron Powder A | 0.86 | 0.87 | 0.82 | 0.018 | 0.014 | 881 | 500 |
| Iron Powder B | 0.87 | 0.12 | 0.35 | 0.023 | 0.016 | 330 | 500 |

Table 3 shows the properties of the vibration-damping metal sheets, prepared according to the present invention the composite metal sheets in the Comparison Examples and the single sheet prepared as the comparative material.

TABLE 3

| | Metal Plate Type | Iron Powder Type | Proportion of Joined Area (%) | Annealing | Thermal Refinement | Sound-Pressure Level (dB) | Shear Load (kgf) |
|---|---|---|---|---|---|---|---|
| Comparative Example 1 | SPCD | — | — | Made | Not Made | 108 | — |
| Comparative Example 2 | SPCD | A | 0.4 | Made | Not Made | 83 | 21 |
| Example 1 | SPCD | A | 0.7 | Made | Not Made | 89 | 79 |
| Example 2 | SPCD | A | 5 | Made | Not Made | 96 | 124 |
| Example 3 | SPCD | A | 10 | Not | Not | 94 | 113 |

TABLE 3-continued

| | Metal Plate Type | Iron Powder Type | Proportion of Joined Area (%) | Annealing | Thermal Refinement | Sound-Pressure Level (dB) | Shear Load (kgf) |
|---|---|---|---|---|---|---|---|
| Example 4 | SPCD | A | 10 | Made | Made Not Made | 99 | 150 |
| Example 5 | SPCD | B | 10 | Made | Not Made | 101 | 121 |
| Example 6 | SPCD | A | 35 | Made | Not Made | 104 | 212 |
| Example 7 | SPCD | B | 35 | Made | Not Made | 104 | 187 |
| Comparative Example 3 | SPCD | B | 60 | Not Made | Not Made | 108 | 269 |
| Comparative Example 4 | SK5 | — | — | Made | Not Made | 117 | — |
| Comparative Example 5 | SK5 | — | — | Made | Made | 122 | — |
| Comparative Example 6 | SK5 | A | 0.3 | * | * | * | * |
| Example 8 | SK5 | A | 5 | Made | Made | 93 | 123 |
| Example 9 | SK5 | A | 10 | Made | Made | 98 | 142 |
| Example 10 | SK5 | B | 10 | Made | Made | 100 | 111 |
| Example 11 | SK5 | A | 45 | Made | Made | 106 | 179 |
| Comparative Example 7 | SK5 | A | 55 | Made | Made | 118 | 183 |
| Comparative Example 8 | SK5 | A | 60 | Made | Made | 120 | 217 |

*: Treatment and measurement were not made, since the sheet spalled away easily after rolling.

As is clear from Table 3, the vibration-damping metal sheets, according to the present invention, of the composite metal sheets made of low-carbon steel plates in Examples 1 to 7 and carbon tool steel plates in Examples 8 to 11 are lower in sound-pressure level and, hence, higher in the vibration-damping properties than the single sheets in Comparison Examples 1, 4 and 5 and the composite sheets in Comparison Examples 3, 7 and 8 of which the proportion of joined area by biting of the minute inclusions of the iron powders exceeds 50%. Since the difference between 20 dB and 6 dB in terms of sound-pressure level corresponds to that between 1/10 and ½ in erms of sound-pressure, the excellence of the vibration-damping metal sheets according to the present invention in vibration-damping properties will be easily appreciated.

It is understood that when the proportion of joined area is as low as 0.3% as in Comparative Example 6, it is not possible to keep the state of joining, since it tends to spall away easily even though annealed, and when the proportion of joined area reaches 0.4%, it is not possible to use the composite sheet as the structural material due to its extremely limited shear load, although that sheet may remain joined. Moreover, when the proportion of joined area exceeds 50% and reaches the order of about 55 to 60% as in Comparative Examples 3, 7 and 8, the shear load is large; however, the composite sheets hardly have a difference in the vibration-damping properties as compared with the inclusion-free single sheets in Comparative Examples 1, 4 and 5, and cannot be used as vibration-damping sheets. Still further, it is noted from the comparison of Example 3 with Example 4 that the shear load can be increased by the annealing-after-rolling procedure.

Examples 12 to 14 & Comparative Examples 9 to 11

Use was made of two annealed, cold-rolled plates of stainless steel (SUS430) having a chemical composition set forth in Table 4 and a thickness of 0.6 mm and one annealed, cold-rolled plate of low carbon steel (SPCC) having a chemical composition set forth in Table 5 and a thickness of 1.0 mm. These three steel plates were put together in the order of stainless steel plate—low carbon steel plate—stainless steel plate, and various amounts of the iron powders A shown in Table 2, were uniformly scattered as the minute inclusions between the adjacent steel plates, then cold-rolled to a finished thickness of 2.0 mm. The cold-rolled plate assembly was thereafter annealed at 850° C. for one hour to manufacture the composite metal sheets of Examples 12 to 14 and Comparative Examples 10 and 11 having various proportions of joined area.

Further, as the comparative material, use was made of two cold-rolled steel plates of annealed stainless steel (SUS430) having a chemical composition set forth in Table 4 and a thickness of 1.8 mm and one cold-rolled steel plate of annealed low carbon steel (SPCC) having a chemical composition set forth in Table 5 and a thickness of 3.0 mm. These three steel plates were put together in the order of stainless steel plate- low carbon steel plate-stainless steel plate and were cold-rolled so that the finished plate has a thickness of 2.0 mm. The finished plate was thereafter annealed at 850° C. for one hour to make a clad metal sheet (Comparative Example 9).

TABLE 4

| Steel Type | C | Si | Mn | P | S | (wt %) Cr |
|---|---|---|---|---|---|---|
| SUS 430 | 0.06 | 0.53 | 0.32 | 0.030 | 0.006 | 16.81 |

TABLE 5

| Steel Type | C | Si | Mn | P | (wt %) S |
|---|---|---|---|---|---|
| SPCC | 0.06 | 0.03 | 0.32 | 0.018 | 0.020 |

Table 6 shows the properties of the sheets in Examples 12 to 14 and Comparative Examples 10 and 11 manufactured in this manner.

TABLE 6

| | Proportion of Joined Area (%) | Sound-Pressure Level (dB) | Shear Load (kgf) |
|---|---|---|---|
| Comparative Example 9 | — | 111 | — |
| Comparative Example 10 | 0.4 | 88 | 12 |
| Example 12 | 2 | 96 | 69 |
| Example 13 | 5 | 99 | 83 |
| Example 14 | 10 | 101 | 104 |
| Comparative Example 11 | 60 | 111 | 144 |

As is clear in Table 6, the vibration-damping metal sheets according to the present invention in the Examples 12 to 14 have a lower in the sound-pressure level, and hence, are higher in the vibration-damping properties than the clad sheet in Comparative Example 9, in which not minute inclusion was used, and the sheet in Comparative Example 11, which has a proportion of joined area by biting of the minute inclusions exceeding 50%. From Comparative Example 10, it is found that when the proportion of joined area by biting of the minute inclusions is 0.4%, the shear load of the sheet is so small that it is not suitable for any structural material.

Examples 15 to 22 & Comparative Examples 12 to 14

Use was made of two annealed, cold-rolled aluminium alloy plates made of an aluminium alloy (JIS H 5052) having a chemical compostion set forth in Table 7 and a thickness of 1.1 mm, and varied amounts of minute inclusions consisting of powders of an age-hardened aluminium alloy (JIS H 2017) set forth in Table 8, were uniformly scattered between respective aluminium alloy plates and were cold-rolled to a finished thickness of 2.0 mm to make composite aluminium alloy sheets. Afterwards, some of such alloy sheets were annealed at 400° C. for 2 hours to manufacture composite metal sheets having various proportions of joined area (Examples 15 to 22 and Comparative Examples 13 and 14).

Further as the comparative material with the aforesaid composite metal sheets, two aluminium alloy (JIS H 5052), each having a thickness of 3.0 mm and a chemical composition set forth in Table 7 were put one upon the other without scattering of any metal powder therebetween, cold-rolled to a thickness of 2.0 mm, and then annealed at 400° C. for 2 hours to make a clad sheet (Comparative Example 12).

TABLE 7

| | | | | | (wt %) |
|---|---|---|---|---|---|
| Si | Fe | Cu | Mn | Mg | Cr |
| 0.17 | 0.16 | 0.03 | 0.03 | 2.36 | 0.25 |

TABLE 8

| Chemical Composition (wt %) | | | | | | Hardness | Mean Particle |
|---|---|---|---|---|---|---|---|
| Si | Fe | Cu | Mn | Mg | Cr | (Hv) | Diameter (μm) |
| 0.40 | 0.18 | 3.73 | 0.51 | 0.48 | 0.03 | 112 | 450 |

Table 9 shows the properties of the sheets manufactured in respective Examples and Comparative Examples.

TABLE 9

| | Proportion of Joined Area (%) | Annealing | Sound Pressure Level (dB) | Shear Load (kgf) |
|---|---|---|---|---|
| Comparative Example 12 | — | Made | 113 | — |
| Example 15 | 0.5 | Made | 91 | 33 |
| Example 16 | 1 | Made | 92 | 36 |
| Example 17 | 5 | Not Made | 95 | 29 |
| Example 18 | 5 | Made | 97 | 40 |
| Example 19 | 10 | Not Made | 98 | 43 |
| Example 20 | 10 | Made | 98 | 52 |
| Example 21 | 40 | Not Made | 103 | 67 |
| Example 22 | 40 | Made | 108 | 69 |
| Comparative Example 13 | 60 | Not made | 113 | 81 |
| Comparative Example 14 | 60 | Made | 113 | 103 |

From Table 9, it is clear that the vibration-damping metal sheets in Examples 15 to 22 according to the present invention are lower in the sound-pressure level and, hence, higher in the vibration-damping properties than the clad sheet in Comparative Example 12 in which no minute inclusion was used and Comparative Examples 13 and 14 of which the proportion of joined area by biting of the inclusions exceeded 50%. From comparison of Examples (17 with 18), (19 with 20) and (21 with 22), it is also found that the composite sheets having the aluminum alloy powders diffused between the aluminium alloy plates are improved in respect of the joint strength by annealingafter-rolling.

Examples 23 to 26 & Comparative Examples 15 and 16

Varied amounts of the iron powders A specified in said Table 2, were uniformly scattered at the minute inclusions between to hot-galvanized steel plates (zinc deposit: 220 g/m² on both sides), each having a thickness of 0.6 mm, and the sheets were then rolled to a finished thickness of 1.0 mm to manufacture composite metal sheets having various proportions of joined area (Example 23 to 26 and Comparative Example 15).

The properties of the vibration-damping metal sheets according to the present invention and the composite metal sheet in the Comparative Example manufactured in the aforesaid manner, are set forth in Table 10 along with those of a single hot-galvanized steel plate (zinc deposit: 220 g/m² on both sids) having a thickness of 1.0 mm, which was provided separately therefrom as the comparative material (Comparative Example 16).

TABLE 10

| | Proportion of Joined Area (%) | Sound-Pressure Level (dB) | Shear Load (kgf) |
|---|---|---|---|
| Example 23 | 1 | 86 | 69 |
| Example 24 | 5 | 91 | 71 |
| Example 25 | 10 | 93 | 82 |
| Example 26 | 35 | 96 | 88 |
| Comparative Example 15 | 65 | 103 | 113 |
| Comparative Example 16 | — | 104 | — |

As is clear from Table 10, the vibration-damping metal sheets in Examples 23 to 26 according to the present invention are lower in the sound-pressure level and, hence, higher in the vibration-damping properties than Comparative Examples 15 and 16, and their vibration-damping properties are excellent. In the instant examples where the plated metal plates are used, it is also found that the vibration-damping metal sheets according to the present invention have excellent properties, as is the case with Examples 1 to 7 where the metal plates used were not plated.

Examples 27 to 34 & Comparative Examples 17 to 20

Use was made of two clad plates, each of the three-layer of aluminium plate—steel plate—aluminium plate structure, the steel plate being a low carbon steel plate having a chemical composition set forth in Table 11 and the aluminium plate having a chemical composition set forth in Table 12, and the thickness of each layer being, respectively, 0.03 mm-0.9 mm-0.3 mm, and the total thickness of the plate being 1.5 mm. Varied amounts of the iron powders B specified in said Table 2, were uniformly scattered as the minute inclusions between these two clad plates, and the sheets were then cold-rolled to a finished thickness of 2.5 mm to manufacture composite metal sheets having various proportions of joined area (Examples 27 to 34 and Comparative Examples 18 to 20).

As the comparative material with said composite metal sheets, also made was a clad sheet which was of the three-layer structure aluminium plate—steel plate—aluminium plate structure, the steel plate being a low carbon plate having a chemical composition set forth in Table 11 and the aluminium plate having a chemical composition set forth in Table 12, each layer having thickness of 0.5 mm-1.5 mm-0.5 mm, respectively, the total thickness being 2.5 mm (Comparative Example 17).

TABLE 11

| C | Si | Mn | P | S | (wt %) |
|---|---|---|---|---|---|
| 0.06 | 0.04 | 0.29 | 0.022 | 0.019 | |

TABLE 12

| Si | Fe | Cu | Mn | Mg | Zn | Ti | (wt %) |
|---|---|---|---|---|---|---|---|
| 0.06 | 0.20 | 0.00 | 0.00 | 0.01 | 0.00 | 0.02 | |

The properties of the sheets in Examples 27 to 34 and Comparative Examples 17 to 20 are shown in Table 13.

TABLE 13

| | Proportion of Joined Area (%) | Sound-Pressure Level (dB) | Shear Load (kgf) |
|---|---|---|---|
| Comparative Example 17 | — | 116 | — |
| Comparative Example 18 | 0.3 | * | * |
| Example 27 | 0.7 | 86 | 41 |

TABLE 13-continued

| | Proportion of Joined Area (%) | Sound-Pressure Level (dB) | Shear Load (kgf) |
|---|---|---|---|
| Example 28 | 1.6 | 87 | 77 |
| Example 29 | 4 | 91 | 129 |
| Example 30 | 7 | 92 | 150 |
| Example 31 | 13 | 98 | 163 |
| Example 32 | 21 | 101 | 177 |
| Example 33 | 32 | 102 | 182 |
| Example 34 | 44 | 104 | 195 |
| Comparative Example 19 | 56 | 113 | 206 |
| Comparative Example 20 | 60 | 115 | 218 |

*: Measurement was not made, since the sheet spalled away easily after rolling.

As is clear from Table 13, it is understood that the vibration-damping metal sheets in Examples 27 to 34 according to the present invention are lower in the sound-pressure level and, hence, better in the vibration-damping properties than the clad sheet in Comparative Example 17 where the minute inclusions were not used and Comparative Examples 19 and 20, in which the proportions of joined area exceeded 50%. In Comparative Example 18, where the proportion of joined area was low, the sheet spalled away easily with a small shock after rolling, and could not keep a joined state.

Examples 35 to 40 & Comparative Examples 21 to 23

Use was made of two annealed, cold-rolled steel plates of low carbon steel (SPCD) having a chemical composition specified in said Table 1 and a thickness of 0.8 mm, and varied amounts of ceramic powders A or B, specified in Table 14, were uniformly scattered as the minute inclusions between the steel plates, and the sheets were then cold-rolled to a finished thickness of 1.6 mm to make composite metal sheets. Some of the composite metal sheets were annealed at 850° C. for one hour, and composite metal sheets having various proportions of joined area were manufactured (Examples 35 to 40 and Comparative Examples 22 and 23). As the comparative example with the aforesaid composite metal sheets, a single annealed, cold-rolled steel plate of low carbon steel (SPCD) having the same chemical composition as that mentioned above and a thickness of 1.6 mm was also prepared (Comparative Example 21).

TABLE 14

| | Main Component | Hardness (Hv) | Mean Particle Diameter (μm) |
|---|---|---|---|
| Ceramic Powders A | Tungsten Carbide | 1900 | 250 |
| Ceramic Powders B | Alumina | 2300 | 450 |

The properties in each Example and Comparative Example are shown in Table 15.

TABLE 15

| | Ceramic Powder Type | Proportion of Joined Area (%) | Annealing | Sound-Pressure Level (dB) | Shear Load (kgf) |
|---|---|---|---|---|---|
| Comparative Example 21 | — | — | — | 108 | — |
| Comparative Example 22 | A | 0.3 | * | * | * |
| Example 35 | A | 2 | Not Made | 94 | 87 |
| Example 36 | A | 2 | Made | 94 | 97 |
| Example 37 | A | 20 | Not Made | 100 | 101 |
| Example 38 | A | 20 | Made | 102 | 106 |
| Example 39 | B | 2 | Not Made | 95 | 93 |
| Example 40 | B | 40 | Not Made | 104 | 124 |
| Comparative | B | 59 | Not Made | 108 | 193 |

TABLE 15-continued

|  | Ceramic Powder Type | Proportion of Joined Area (%) | Annealing | Sound-Pressure Level (dB) | Shear Load (kgf) |
|---|---|---|---|---|---|
| Example 23 |  |  |  |  |  |

*: Treatment and measurement were not made, since easy spalling away after rolling took place.

As is clear from Table 15, the vibration-damping metal sheets in Examples 35 to 40 according to the present invention are lower in the sound-pressure level and, hence, better in the vibration-damping properties than Comparative Example 21 and Comparative Example 23 in which the proportion of joined area exceeded 50% by biting of the ceramic powders acting as the minute inclusions. When the proportion of joined area by biting of the ceramic powders was 0.3%, it spalled away easily with a small shock after rolling, and could not keep a joined state. It is thus found that the effect of the present invention is had in the case wherein the ceramic powders as the minute inclusions are used as in the case wherein metal powders are used.

Examples 41 to 45 & Comparative Example 24

Use was made of two annealed, cold-rolled steel plates of low carbon steel (SPCD) having the chemical composition specified in said Table 1 and a thickness of 0.8 mm, and varied amounts of short fibers of metals having a chemical composition specified in Table 16 were uniformly scattered between these steel plates, and the sheets were then cold-rolled to a finished thickness of 1.4 mm to make composite metal sheets. Afterwards, some of the composite metal sheets were annealed at 850° C. for one hour to manufacture composite metal sheets having various proportions of joined area (Examples 41 to 45).

As the comparative material with the aforesaid metal sheets, a single annealed, cold-rolled steel plate of low carbon steel having the same chemical composition as that mentioned above and a thickness of 1.4 mm (Comparative Example 24) was also manufactured.

TABLE 16

| Chemical Composition (wt %) | | | | | Mean Fiber Diameter (μm) | Mean Fiber Length (mm) | Hardness (Hv) |
|---|---|---|---|---|---|---|---|
| C | Si | Mn | P | S |  |  |  |
| 0.28 | 0.24 | 0.48 | 0.007 | 0.008 | 500 | 50 | 481 |

The properties in respective Examples and Comparative Examples are shown in Table 17.

TABLE 17

|  | Proportion of Joined Area (%) | Annealing | Sound-Pressure Level (dB) | Shear Load (kgf) |
|---|---|---|---|---|
| Comparative Example 24 | — | — | 105 | — |
| Example 41 | 2 | Not Made | 89 | 60 |
| Example 42 | 2 | Made | 93 | 89 |
| Example 43 | 5 | Not Made | 94 | 87 |
| Example 44 | 5 | Made | 97 | 116 |
| Example 45 | 10 | Not Made | 98 | 111 |

As is clear from Table 17, it is found that the vibrationdamping metal sheets in Examples 41 to 45 according to the present invention are lower in the sound-pressure level and, hence, the vibration-damping properties are better than the single sheet in Comparative Example 24. The effect of the present invention is had in the case wherein relatively short fibers of metal are used as the minute inclusions as in the case wherein the powders are used.

Examples 46 to 48 & Comparative Examples 25 to 27

Use was made of two annealed, cold-rolled steel plates of low-alloy steel (SNCM220) having a chemical composition specified in Table 18 and a thickness of 2.1 mm, and varied amount of hard steel wires having a chemical composition specified in Table 19, a hardness Hv of 783 and the diameter of 0.7 mm were supplied and put as the minute inclusions between the steel plates, and the sheets were then cold-rolled to a finished thickness of 4.0 mm to make composite metal sheets. In supplying the steel wires between the steel plates in cold-rolling, they were uniformly arranged at the predetermined intervals in the widthwise direction of the steel plates. Afterwards, the composite metal sheets were annealed at 700° C. for two hours, and were then subjected to refining heat treatments involving hardening at 860° C. and tempering at 200° C. to manufacture composite metal sheets having various proportions of joined area (Examples 46 to 48 and Comparative Examples 26 to 27).

As the comparative material with the aforesaid composite metal sheets, a single hot-rolled steel plate of 4.0 mm in thickness and made of low-alloy steel (SNCM220) having the same chemical composition as that mentioned above which was subjected to the same refining heat treatments as that mentioned above was also manufactured (Comparative Example 25).

TABLE 18

| C | Si | Mn | P | S | Ni | Cr | Mo |
|---|---|---|---|---|---|---|---|
| 0.21 | 0.28 | 0.75 | 0.006 | 0.008 | 0.48 | 0.58 | 0.21 |

TABLE 20

|  | Proportion of Joined Area (%) | Sound-Pressure Level (dB) | Shear Load (kgf) |
|---|---|---|---|
| Comparative Example 25 | — | 125 | — |
| Comparative Example 26 | 0.4 | 97 | 9 |
| Example 46 | 5 | 106 | 49 |
| Example 47 | 20 | 112 | 66 |
| Example 48 | 40 | 119 | 71 |
| Comparative Example 27 | 70 | 124 | 92 |

The properties in the respective Examples and Comparative Examples are shown in Table 20.

TABLE 19

|  |  |  |  | (wt %) |
|---|---|---|---|---|
| C | Si | Mn | P | S |
| 0.60 | 0.12 | 0.30 | 0.020 | 0.017 |

As is clear from Table 20, the vibration-damping metal sheets in Examples 46 and 47 according to the present invention are lower in the sound-pressure level and, hence, better in the vibration-damping properties than the single sheet in Comparative Example 25 and Comparative Example 27 in which the proportion of joined area exceeded 50%. From Comparative Example 26, it is also found that in the case wherein the proportion of joined area is 0.4%, difficulty is involved in using it as the structural material due to low shear load. From this, it is found that the effect of the present invention is had in the case wherein the wiry material is used as the minute inclusions as in the case wherein the powders are used.

Examples 49 to 52 & Comparative Examples 28 and 29

Use was made of two annealed, cold-rolled steel plates of decarbonized steel (SPP) having a chemical composition specified in Table 21 and a thickness of 0.8 mm, and varied amounts of steel networks of varied meshes knit of stainless steel wires having a chemical composition specified in Table 22, a hardness Hv of 386 and the diameter of 0.5 mm were put as the minute inclusions between the steel plates, and the sheets were then cold-rolled to a finished thickness of 1.6 mm to make composite metal sheets. Afterwards, the composite metal sheets were annealed at 900° C. for one hour to manufacture composite metal sheets having various proportions of joined area (Examples 49 to 52 and Comparative Examples 29).

As the comparative material with the aforesaid composite metal sheets, a single annealed, cold-rolled steel plate of decarbonized steel (SPP) having the same chemical composition as mentioned above and a thickness of 1.6 mm was also manufactured.

TABLE 21

| C | Si | Mn | P | S (wt %) |
|---|---|---|---|---|
| 0.005 | 0.01 | 0.43 | 0.031 | 0.035 |

TABLE 22

| C | Si | Mn | P | S | Ni | Cr (wt %) |
|---|---|---|---|---|---|---|
| 0.07 | 0.87 | 1.56 | 0.042 | 0.027 | 8.51 | 19.03 |

The properties in the respective examples and Comparative Examples are shown in Table 23.

From Table 23, it is found that the effect of the present invention is had in the case wherein the network composed of wiry material is used as in the case wherein the powders are used.

TABLE 23

| | Proportion of Joined Area (%) | Sound-Pressure Level (dB) | Shear Load (kgf) |
|---|---|---|---|
| Comparative Example 28 | — | 106 | — |
| Example 49 | 4 | 94 | 61 |
| Example 50 | 9 | 96 | 72 |
| Example 51 | 15 | 99 | 79 |
| Example 52 | 30 | 101 | 82 |
| Comparative Example 29 | 56 | 105 | 94 |

Examples 53 to 61 & Comparative Examples 30 to 35

Use was made of a set of two cold-rolled steel plates of low carbon steel (SPCD) having a thickness of 0.8 mm and another set of two annealed, cold-rolled steel plates of carbon tool steel (SK5) having a thickness of 1.6 mm. The chemical composition of each steel is shown in Table 24.

TABLE 24

| | C | Si | Mn | P | S (wt %) |
|---|---|---|---|---|---|
| Low Carbon Steel (SPCD) | 0.065 | 0.20 | 0.24 | 0.016 | 0.012 |
| Carbon Tool Steel (SK5) | 0.82 | 0.27 | 0.45 | 0.007 | 0.006 |

For the minute inclusions to be used, iron powders C specified in Table 25 were plated with Cu to form a 10 μm-thick layer on their surfaces, and varied amounts of such minute inclusions were uniformly scattered between the aforesaid two steel plates, which were cold-rolled to have a finished thickness of 1.6 mm for a finished plate of low carbon steel and 3.2 mm for a finished plate of carbon tool steel to obtain composite metal sheets. Afterwards, one-hour annealing at 800° C. and two-hour annealing at 900° C. were carried out for low carbon steel and carbon tool steel, respectively, to thereby manufacture composite metal sheets having various proportions of joined area (Examples 53 to 61 and Comparative Examples 31, 32, 34 and 35).

TABLE 25

| | C | Si | Mn | P | S | Hardness (Hv) | Mean Particle Diameter (μm) (wt %) |
|---|---|---|---|---|---|---|---|
| Iron Powder C | 0.86 | 0.12 | 0.35 | 0.023 | 0.016 | 493 | 700 |

As the comparative material with the aforesaid composite steel sheets, single cold-rolled steel plates (Comparative Examples 30 and 33) were prepared from low carbon steel (SPCD) having a thickness of 1.6 mm and carbon tool steel (SK5) having a thickness of 3.2 mm, both having the chemical composition specified in Table 24, respectively.

The results of the sound-pressure level and shear load of the sheets in respective Examples and Comparative Examples 30 to 35 measured are given in Table 26.

TABLE 26

| | Steel Type of Metal Plate | Proportion of Joined Area (%) | Sound-Pressure Level (dB) | Shear Load (kgf) |
|---|---|---|---|---|
| Comparative Example 30 | SPCD | — | 108 | — |
| Comparative Example 31 | SPCD | 0.3 | 84 | 25 |
| Example 53 | SPCD | 3.0 | 87 | 117 |
| Example 54 | SPCD | 3.2 | 89 | 120 |
| Example 55 | SPCD | 11.5 | 92 | 151 |
| Example 56 | SPCD | 20.2 | 97 | 158 |
| Example 57 | SPCD | 43.0 | 101 | 231 |
| Comparative Example 32 | SPCD | 66.0 | 107 | 249 |
| Comparative Example 33 | SK 5 | — | 116 | — |
| Comparative Example 34 | SK 5 | 0.4 | 101 | 30 |
| Example 58 | SK 5 | 9.7 | 103 | 137 |
| Example 59 | SK 5 | 10.6 | 105 | 142 |
| Example 60 | SK 5 | 41.5 | 108 | 162 |
| Example 61 | SK 5 | 42.2 | 108 | 169 |
| Comparative Example 35 | SK 5 | 64.0 | 115 | 183 |

As shown in Table 26 and in view of both sound-pressure level and the shear load, the vibration-damping metal sheets in Examples 53 to 61 according to the present invention are excellent as compared with those Comparative Examples 30 to 35 where the metal plates of the same type of steel were used and can be used as structural materials, having both vibration-damping properties and joint strength. It is thus found that the effect of the present invention is had, or an increased effect thereof is had, in the case wherein the materials plated with Cu etc. are used as the minute inclusions as in the case wherein the inclusions not plated are used.

Examples 62 and 63 & Comparative Examples 36 and 37

Use was made of a set of two aluminium-bronze plates having a thickness of 0.8 mm and another set of stainless steel plates having a thickness of 0.8 mm. The chemical compositions of these two sets of metal plates are indicated in Table 27.

TABLE 27

|  |  |  |  |  |  |  |  | (wt %) |
|---|---|---|---|---|---|---|---|---|
| Alminium-Bronze | Fe 2.9 | Al 8.1 | Mn 0.63 | Ni 0.76 |  |  |  |  |
| Stainless Steel | C 0.07 | Si 0.45 | Mn 0.27 | P 0.033 | S 0.007 | Ni 0.09 | Cr 17.03 |  |

Various amounts of the iron powders C specified in said Table 25 and plated with Cu to form a 10 μm-thick layer thereon were uniformly scattered between two metal plates as the minute inclusions, and the sheets were then finished by cold-rolling to have a thickness of 1.6 mm to manufacture the vibration-damping metal sheets according to the present invention, which are further annealed at 750° C. for one hour (Examples 26 and 63).

As the comparative material with the aforesaid vibration-damping metal sheets, single sheets (Comparative Examples 36 and 37) were each prepared from an aluminium-bronze plate and a stainless steel plate, both having the chemical composition shown in Table 27 and a thickness of 1.6 mm, under the same annealing conditions as those mentioned above.

The properties in the respective examples 62 and 63 and Comparative Examples 36 and 37 are indicated in Table 28.

TABLE 28

|  | Metal Type of Metal Plate | Proportion of Joined Area (%) | Sound-Pressure Level (dB) | Shear Load (kgf) |
|---|---|---|---|---|
| Comparative Example 36 | Aluminium-Bronze | — | 110 | — |
| Example 62 | Aluminium-Bronze | 10.2 | 103 | 43 |
| Comparative Example 37 | Stainless Steel | — | 112 | — |
| Example 63 | Stainless Steel | 18.1 | 107 | 52 |

From Table 28, it is found that whether the type of metal forming the metal plates is of high-alloy steel or non-ferrous metals, the effect from the use of the materials plated with Cu etc. as the minute inclusions can be perceived as in the case of the said Examples 53 to 61.

INDUSTRIAL APPLICABILITY

According to the vibration-damping metal sheets of the present invention, more than half of the area of the metal plates is occupied by the area of the metal plates at which they are not joined together, but simply come into contact with each other, and the friction occurring between the metal plates at this area assures excellent vibration-damping properties. Further, since the minute inclusions with which the joined portion is made of are formed of materials of heat-resistant metals or ceramics, rather than materials which are poor in heat resistance such as plastic materials, it is very unlikely that the structure and vibration-damping properties of the composite metal sheets will be destroyed or deteriorated by heat treatments to be applied depending upon the purpose or by the use thereof in high-temperature environment, and high shear force is maintained between the metal plates. Still further, even if the minute inclusions are formed of non-conductive ceramics as well as of metals, the composite metal sheets of the present invention possess sufficiently high conductivity as well as weldability, since the metal plates come into contact with each other at the portion at which the minute inclusions are not present.

Since the vibration-damping metal sheets according to the present invention possess such excellent physical properties, they are best-suited for use not only for foundation metals and gears of diamond cutters or chip saws as a high speed rotators but also for structural materials needed to have vibration-damping properties as well as heat resistance, weldability and toughness such as working structures in automobiles etc.

What is claimed is:

1. A vibration-damping metal sheet, comprising:
   metal plates, and
   minute inclusions joining said metal plates together, said minute inclusions being substantially and uniformly present between said metal plates and biting into said metal plates, said metal plates contacting each other but not being metallurgically joined to each other at portions where said minute inclusions are not present, said minute inclusions biting into a projection area of 0.5 to 50% of the area of said metal plates.

2. A vibration-damping metal sheet as defined in claim 1, wherein at least one of said metal plates is a clad metal plate.

3. A vibration-damping metal sheet as defined in claim 1, wherein a mean particle size of said minute inclusions in the vertical section with respect to the lengthwise direction thereof is 100 to 1000 micrometers.

4. A vibration-damping metal sheet as defined in claim 1 wherein said minute inclusions are powders.

5. A vibration-damping metal sheet as defined in claim 1 wherein said minute inclusions are a fine wiry material.

6. A vibration-damping metal sheet as defined in claim 1 wherein said minute inclusions are a network of a fine wiry material.

7. A vibration-damping metal sheet as defined in claim 1 wherein said minute inclusions are metal.

8. A vibration-damping metal sheet as defined in claim 1 wherein said inclusions are a material having on its surface a coating layer of a metal easily diffusible into the metal plates.

9. A vibration-damping metal sheet as defined in claim 1 wherein said minute inclusions are diffusion-joined to the metal plates.

10. A vibration-damping metal sheet as defined in claim 1 wherein said minute inclusions are ceramic.

* * * * *